United States Patent [19]

Mitzner

[11] Patent Number: 4,781,069

[45] Date of Patent: Nov. 1, 1988

[54] MODE SELECTION APPARATUS FOR MULTIPLE TUBE CORIOLIS TYPE MASS FLOW METERS

[75] Inventor: Erik L. Mitzner, Saratoga, Calif.

[73] Assignee: Exac Corporation, Campbell, Calif.

[21] Appl. No.: 871,113

[22] Filed: Jun. 5, 1986

[51] Int. Cl.[4] .............................................. G01F 1/84
[52] U.S. Cl. .................................................. 73/861.38
[58] Field of Search ..................................... 73/861.38

[56] References Cited

U.S. PATENT DOCUMENTS

| | | | |
|---|---|---|---|
| 4,127,028 | 11/1978 | Cox et al. | 73/861.38 |
| 4,491,025 | 1/1985 | Smith et al. | 73/861.38 |
| 4,655,089 | 4/1987 | Kappelt et al. | 73/861.38 |

FOREIGN PATENT DOCUMENTS 8505677 12/1985 PCT Int'l Appl. .

Primary Examiner—Herbert Goldstein
Attorney, Agent, or Firm—Rosenblum, Parish & Bacigalupi

[57] ABSTRACT

An improvement to a mass flow rate sensor which includes the provision of at least one mode selection plate at each of the inlet and outlet ends of the sensor. The plates are provided in addition to other tube end termination means and are configured to have predetermined stiffness characteristics (area moments of inertia) in the X, Y and Z axes. In one preferred embodiment, the mode selection plates are configured in a generally squashed H-shaped configuration in which the tube ends pass through the centers of the vertical legs of the H and the cross member of the H spans the space between the two tubes. In other embodiments, the plates are variously configured to alter the stiffness characteristics along the various axes of the mode selection plate.

9 Claims, 3 Drawing Sheets

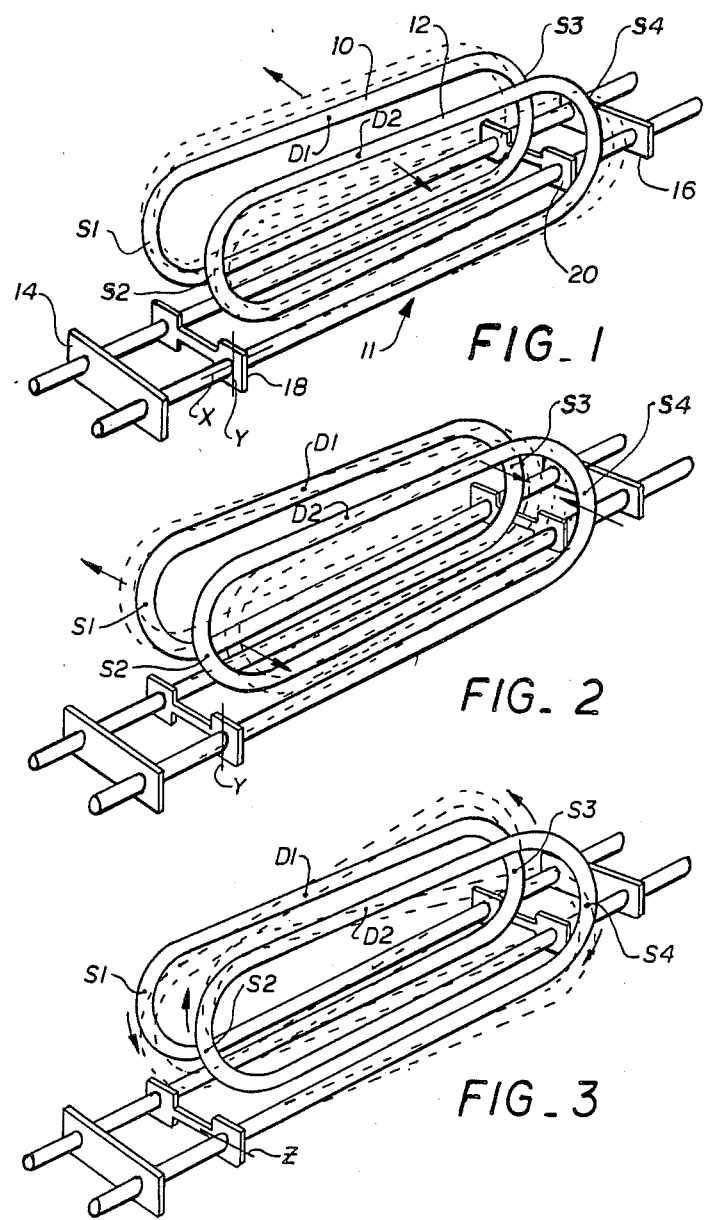

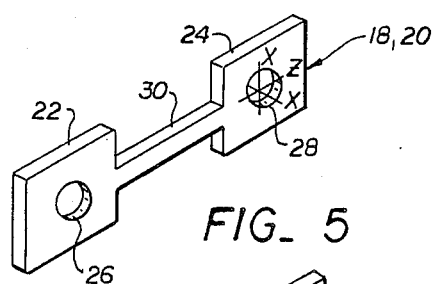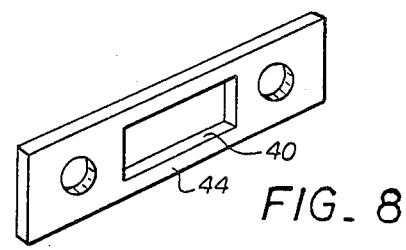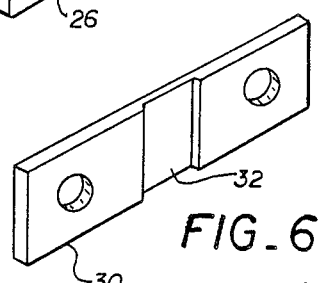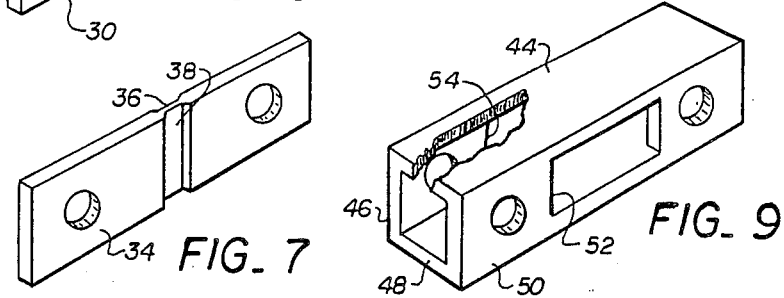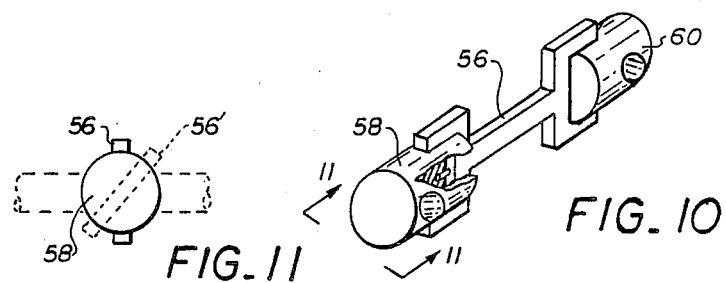

MODE SELECTION APPARATUS FOR MULTIPLE TUBE CORIOLIS TYPE MASS FLOW METERS

BACKGROUND OF THE INVENTION

1. Field of the Invention

The present invention relates generally to Coriolis type mass flow meters, and more particularly, to an improvement in the sensor thereof for minimizing the vibrational coupling between drive mode vibration and other mode vibrations thereby producing a more stable sensing device.

The present application is related to the copending applications of Andrew K. Levien, entitled *Sensor Apparatus For Mass Flow Rate Measurement System*, Ser. No. 822,123 filed Jan. 24, 1986, now abandoned; of Erik B. Dahlin entitled "Apparatus for Mass Flow Rate and Density Measurement", Ser. No. 775,739, filed Sept. 13, 1985, now U.S. Pat. No. 4,711,132; and of Erik B. Dahlin et al. entitled "Improved Apparatus for Mass Flow Rate and Density Measurement", Ser. No. 777,707, filed Sept. 13, 1985, now U.S. Pat. No. 4,660,421, all of which are assigned to the assignee of the present application.

2. Discussion of the Prior Art

The present invention is an improvement on multiple tube designs of Coriolis mass flow meters of the type disclosed in the above-mentioned copending applications as well those disclosed in the prior art U.S. Pat. Nos. to Cox et al, 4,127,028; Smith 4,422,338; and Smith et al, 4,491,025. The sensors used in these types of meters typically consist of oppositely driven tubular elements of looped or U-tube configuration connected by stiff isolation plates. With respect to relative motion between the tubes, these plates isolate the weld points of the tubes from the motion of the tubes and define vibrational node points in the system. In such apparatus the tube elements are vibrated in the drive mode at one frequency and are consequently subjected to Coriolis force induced vibration when mass is flowing through the tube.

The stability and accuracy of these devices are dependent upon the frequency relationships among the various natural modes of vibration of the structure. The resonant frequency of each particular mode of vibration is dependent upon the stiffness of the structure and the mass inertial properties of the structure in that mode.

The stiffness of the structure is directly proportional to the stiffness of the tube material used and also depends upon the geometry of the loop and the isolation plate location.

In the loop or U-tube type structure, drive oscillation is provided at corresponding drive points on each loop (or U-tube) and causes motion of the tubes in opposite directions. This particular mode of oscillation is normally referred to as the "drive mode".

When mass is flowing through the tubes and the drive motion is applied, Coriolis forces will be induced within the tubes and a Coriolis induced motion will be superimposed upon the drive motion.

In addition to the drive mode oscillation and the Coriolis mode oscillation, dual loop structures are also subject to oscillation in a "roll mode" wherein the loops move in the directions tending to wind and unwind the loops. It will be appreciated that the three motions all combine to cause the sensor to experience a compound vibrational motion which will favor one or more of the modes depending upon the stiffness of the structure in each mode.

In previous designs, rigid end isolation plates have been utilized to limit the vibrational characteristics of the device to the inherent structural characteristics of the U-tubes or loops disposed between the separated end isolation plates. These characteristics will of course also be influenced by any mass attached to the U-tubes or loops as it will modify the mass inertia of the structure.

It has been recognized that one can improve the operational characteristics of a particular sensor configuration by preferentially modifying the stiffness of the structure in the various modes in order to "decouple" the vibrations, i.e., increase the separation between their natural frequencies and thus render the structure more sensitive to certain modal vibrations and less sensitive to others. One teaching of a method in which the relative characteristics of a pair of sensor loops may be selectively modified is disclosed in the above-identified copending application of Andrew K. Levien. The present invention relates to another method for preferentially modifying the stiffness of a particular sensor structure.

SUMMARY OF THE PRESENT INVENTION

It is therefore a primary objective of the present invention to provide a novel means for adjusting the relative vibrational characteristics of a pair of tubular mass flow rate sensor elements without changing the structural characteristics of the flow conducting tubes per se.

Another objective of the present invention is to provide a means for minimizing the vibrational coupling between the drive frequency and other vibrational frequencies of the loops of a multiple tube mass flow rate sensor.

Still another object of the present invention is to provide a means for improving the stability of a particular mass flow rate sensing structure.

Briefly, a preferred embodiment of the present invention includes the provision of at least one "mode selection plate" at each of the inlet and outlet ends of a dual loop mass flow rate sensor. The mode selection plates are provided in addition to other tube end termination isolation means and the configured to have predetermined stiffness characteristics (area moments of inertia) in the X, Y and Z axes. In one preferred embodiment, the mode selection plates are configured in a generally squashed H-shaped configuration in which the tube ends pass through the centers of the vertical legs of the H and the cross member of the H spans the space between the two tubes. In other embodiments, the mode selection plates are variously configured to alter the stiffness characteristics along the various axes of the mode selection plate.

Among the advantages of the present invention is that for a given tube geometry, it enables the designer to modify the vibrational coupling between the drive and other natural frequencies without otherwise modifying the tube geometry.

Another advantage of the present invention is that for a particular tube geometry it allows the designer to modify the amplification factor to improve the accuracy of the sensor in the measurement of mass flow rate without otherwise modifying the tube geometry.

These and other objects of the present invention will no doubt become apparent to those of ordinary skill in the art after having read the following detailed disclosure of the preferred embodiment shown in the several figures of the drawing.

IN THE DRAWING

FIGS. 1, 2 and 3 are perspective views of a dual loop mass flow rate sensor structure 11 sans drive and detector apparatus, modified in accordance with the present invention and respectively illustrating vibration in the drive, Coriolis and roll modes;

FIGS. 5-9 illustrate various configurations of mode selection plates in accordance with the present invention;

FIG. 10 illustrates an embodiment of a mode selection device having selective mode characteristics; and FIG. 11 is an end view taken along the line 11—11 in FIG. 10 illustrating operation thereof.

DETAILED DESCRIPTION OF THE PREFERRED EMBODIMENTS

Figure 4A:
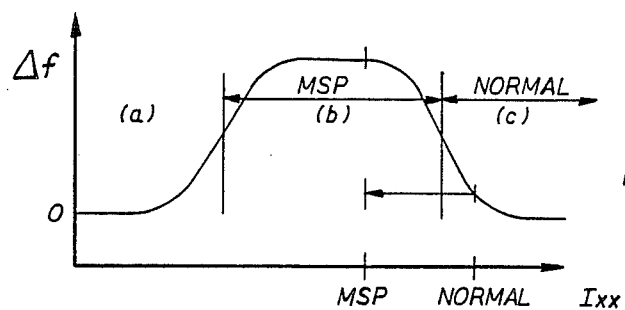
FIG. 4a is a generalized stiffness versus Δf diagram illustrating the example given in the specification.

Turning now to FIGS. 1-3 there is disclosed a dual loop sensor structure including first and second tubular loops 10 and 12 the distal ends of which are typically joined together by isolation plates 14 and 16. Not shown is the drive structure which would normally be coupled to the loops at the points D1 and D2, the motion sensors which would normally be coupled to the loops between the points S1 and S2, and S3 and S4, and the inlet and outlet manifolds that are usually affixed to the tube ends. The isolation plates 14 and 16 are normally made stiff enough so that any relative loop vibration transmitted through the tubes is terminated at the points of their contact with the plates.

In addition, in accordance with the present invention, a pair of mode selection plates 18 and 20 are connected between the tubes proximate their attachment to isolation plates 14 and 16 respectively. As indicated more clearly in FIG. 5, the mode selection 18 and 20 are of a generally squashed H-shape in which the vertically extending side portions 22 and 24 are provided with tube receiving apertures 26 and 28, and are joined together by a bridging portion 30. In accordance with the present invention, the mode selection plates 18 and 20 are purposely made less stiff than the isolation plates 14 and 16, and thus do not terminate loop vibrations at their junction points to the tubes. More specifically, the plates 18 and 20 are designed to have predetermined stiffnesses along each of the X, Y and Z axes (at each tube junction) so that their respective stiffnesses along the various axes each affects one major vibration mode.

Referring particularly to FIG. 1 of the drawing, it will be appreciated that drive motion applied to the loops 10 and 12 at points D1 and D2 will tend to rotate each tube end about a central X axis of the tube end at the point at which the tube end passes through an aperture in one of the plates 18 and 20. Since the tube ends are rigidly affixed to the plates 18 and 20, the drive motion of the loop is affected by the stiffness of the plate when it is stressed around the X-axis. This stiffness is related to the area moment of inertia of the plates 18 and 20 around the X axis and is symbolized by the term $I_{xx}$.

As illustrated by the oppositely directed arrow pairs in FIG. 2 of the drawing, during the application of drive forces in one direction, i.e., away from each other as depicted in FIG. 1, induced Coriolis forces tend to deflect each loop generally about its drive point, thereby tending to bend the lower leg of each loop and each plate 18 and 20 around a Y-axis. As a result, the stiffness of the plate affects the Coriolis induced motion. Accordingly, stiffness in this direction is related to the plates area moment of inertia referred to as $I_{yy}$.

The third vibration mode exhibited by the pair of tubes is referred to as the roll or (rocking) mode illustrated in FIG. 3 and tends to bend the legs of each loop around the Z-axes, thereby tending to likewise twist the plates 18 and 20 around the Z-axes. The stiffness of plates 18 and 20 about the Z-axes is related to the area moment of inertia referred to as $I_{zz}$.

Because the three area moments of inertia $I_{xx}$, $I_{yy}$, and $I_{zz}$, of the plates 18 and 20 are affected differently by the dimensions of the plates, the plates 18 and 20 can be tailored to affect each vibrational mode differently. This allows the designer to fine-tune each modal frequency of the sensor structure without changing the loop geometry or plate locations along the tubes and thereby achieve optimal frequency separation thus producing optimal meter performance. By way of example, a comparison of a sensor having a standard isolation plate substituted for the mode selection plates 18 and 20 versus the same sensor structure with mode selection plates 18 and 20 is shown in the following table.

The results shown in the above table are graphically illustrated in FIG. 4a of the drawing wherein the shift in $I_{xx}$ accomplished by use of mode selection plates (MSP) is depicted. From this diagram it will be appreciated that if the shift is into the region (a), $I_{xx}$ will be too low and the plates will have little or no effect on the structure. Similarly, if the shift is in the region (c), the same result will occur. But if the shift is into region (b) the plates will be stiff in the asymmetric drive mode but not stiff in the symmetric drive mode and will thereby produce different natural frequencies and Δf will be materially greater than 0. (Δf=f(asymmetric))−f(symmetric) where asymmetric refers to movement of the tubes in opposition to each other and symmetric refers to movements of the tubes in the same direction.

| Characteristics of Identical Sensor Except for Geometry and Location of Plates (for tube stiffness $I_{xx} = 6.44 \times 10^{-5}$ in$^4$ and $I_{yy}I_{zz} = 3.22 \times 10^{-5}$ in$^4$) | | |
|---|---|---|
| CHARACTERISTICS | NORMAL | WITH MSP |
| Asym. Drive Freq. (f$_1$) | 74.63 Hz | 74.65 Hz |
| Sym. Drive Freq. (f$_2$) | 74.17 Hz | 68.29 Hz |
| f$_1$ − f$_2$ = Δf | .46 Hz | 6.36 Hz |
| Amplification factor | 3.207 | 2.895 |
| Plate Stiffness (I$_{yy}$) | $1.96 \times 10^{-3}$ in$^4$ | $1.047 \times 10^{-6}$ in$^4$ |
| Plate Stiffness (I$_{xx}$) | $.277 \times 10^{-3}$ in$^4$ | $.184 \times 10^{-6}$ in$^4$ |
| Plate Stiffness (I$_{zz}$) | $.845 \times 10^{-3}$ in$^4$ | $.541 \times 10^{-6}$ in$^4$ |
| Distance between plates | 6.43 in | 5.40 in |

Through computer modeling and actual laboratory testing, it has been found that use of mode selection plates in accordance with the present invention allows one to shift the resonant frequency of other modes further away from the resonant frequency of the drive mode, and thus minimize the vibrational coupling between the drive mode and other frequency modes. This also results in further minimizing the coupling of external vibrations to the sensor structure 11. As a consequence, flow meter readings at zero flow are more stable and result in better accuracy at low flow rates.

This allows the use of larger tubing than would normally be used in certain types of flow meters without degrading the low flow rate performance, and thereby significantly reduces the pressure drop across the meter. Moreover, by changing the dimensions of the mode selection plate and noting the response of the structure, one can modify the amplification factor to find the most stable configuration for a desired sensitivity. Examples of such modification and their effects on the respective area moments of inertia are shown in FIGS. 4b–4d.

Figure 4B:
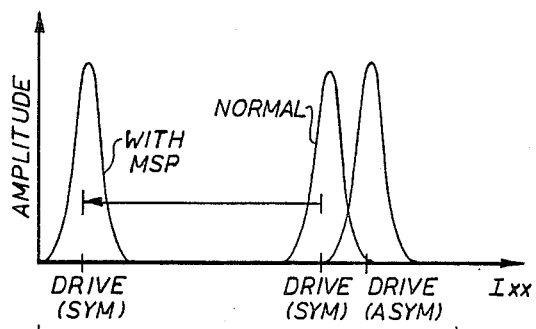
FIGS. 4b-4d are power spectral density diagrams illustrating shifts in drive, roll and Coriolis frequencies accomplished in accordance with the present invention.

FIG. 4b illustrates that in cases where the symmetric and asymmetric drive frequencies are substantially equal, as in the case of a rigid boundary condition, by using a mode selection plate (MSP) to provide a substantially less rigid boundary, a much greater separation between the respective frequencies can be accomplished.

Figure 4C:
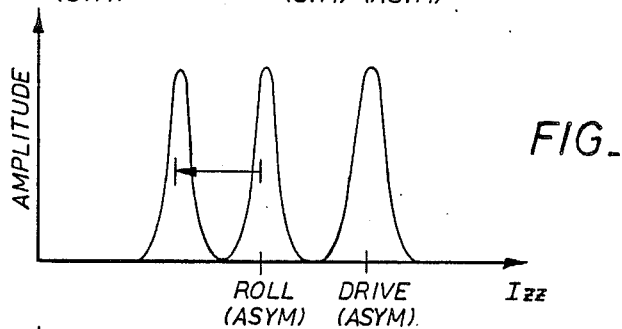

In FIG. 4c it is shown that when, with a hard boundary condition the roll frequency is close to the drive frequency, a change in the stiffness of the structure can be used to move the roll frequency away from the drive frequency.

Figure 4D:
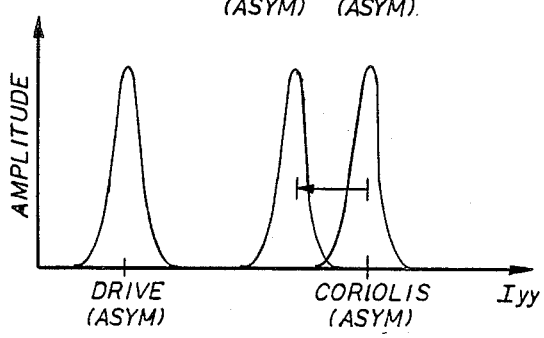

FIG. 4d shows that one can change the amplification factor (relationship between the Coriolis frequency and the drive frequency) of a structure by changing the stiffness in the Coriolis direction and thereby improve the accuracy of the device.

Although the illustrated embodiments utilize isolation plates 14 and 16 positioned at the tube ends proximate the attachment points to the manifold (not shown), such isolation plates are not necessarily required in order for the mode selection plates to perform their desired function. However, the isolation plates 14 and 16 substantially reduce the oscillatory stresses at the tube-to-manifold welds. Since the mode selection plate stiffness is quite low with respect to the stiffness of the isolation plates 14 and 16, a significant spatial separation along the X axes must normally be maintained between the two in order for the mode selection plates to have their desired effects.

Other embodiments of mode selection plates are illustrated in FIGS. 6–11. In FIG. 6, a rectangular plate 30 has the cross sectional area of its mid-section reduced on one side at 32. In FIG. 7, a plate 34 has the cross section of its mid-portion reduced by the removal of portions of material on each side at 36 and 38. In FIG. 8, a rectangular aperture 40 is removed from the mid-section of a plate 42. In FIG. 9, a box-type structure is illustrated in which four integrally formed plates 44, 46, 48 and 50 have rectangular apertures 52 and 54 formed in the plates 50 and 46 respectively.

In FIG. 10, still another embodiment is illustrated wherein a double forked bridging member 56 is rotatably pinned to a pair of tube engaging cylinders 58 and 60 in such a manner that the member 56 may be rotated into a desired position relative to the tubes and then rigidly attached in place to provide a desired vibrational influence on the tubes.

Although the present invention has been described above in terms of several preferred embodiments, it will be appreciated by those skilled in the art that additional alterations and modifications thereof may be made to achieve the benefits of the invention. It is therefore intended that the appended claims be interpreted as covering all such alterations and modifications as fall within the true spirit and scope of the invention.

What is claimed is:

1. A dual tube Coriolis mass flow sensor structure comprising:
    a pair of tubular members which are spaced apart and extend generally in parallel, and which have corresponding longitudinal extremities joined together to provide parallel flow paths for flowing material;
    drive means for applying oscillatory drive forces to both of said tubular members to cause portions between the extremities of said tubular members to oscillate relative to each other in a first mode of oscillation due to said drive forces, and to oscillate relative to each other in a second mode of oscillation due to Coriolis forces induced by the mass of material flowing through said tubular members;
    motion detecting means disposed to detect Coriolis force induced motion of said tubular members as said material flows therethrough; and
    mode selection means including at least one elongated member
        having distal ends rigidly affixed to respective ends of said tubular members so that said elongated member extends generally transverse to the longitudinal axes of said tubular members, and
        having low stiffness about at least one axis passing through the intersection of said elongated member and the longitudinal axis of one of said tubular members, such that, for at least one of said modes of oscillation, said mode selection means does not provide a node said stiffness being selected to modify the vibrational stiffness of and shift the natural frequency of said sensor structure in one of said modes of oscillation relative to the natural frequency of said structure in the other of said modes of oscillation.

2. A dual tube Coriolis mass flow rate sensor structure as recited in claim 1 wherein said mode selection means is affixed to said tubular members at points proximate their extremities.

3. A dual tube Coriolis mass flow sensor structure as recited in claim 1, wherein said at least one elongated member has distal end portions each having a predetermined first transverse cross-sectional area and a transversely extending aperture formed therein for receiving a respective one of said tubular members, and a midportion between said end portions having a predetermined second transverse cross-sectional area smaller than said first cross-sectional area.

4. A dual tube Coriolis mass flow rate sensor structure as recited in claim 3, wherein said elongated member is generally H-shaped with the H side members forming said distal ends and with the H cross-member including said mid-portion and spanning a substantial portion of the space separating said tubular members.

5. A dual tube Coriolis mass flow rate sensor structure as recited in claim 3, wherein said elongated member is generally rectangular in configuration and has an aperture formed in said mid-portion.

6. A dual tube Coriolis mass flow rate sensor structure as recited in claim 3, wherein said second cross sectional area is made smaller than said first cross-sectional area by a recess in one face of said midportion transverse to the length of said elongated member.

7. A dual tube Coriolis mass flow rate sensor structure as recited in claim 3, wherein said member is generally rectangular in configuration and has back-to-back recessed portions in each face of said midportion extending transverse to the length of said elongated member.

8. A dual tube Coriolis mass flow sensor structure as recited in claim 3, further comprising at least one rigid termination mass rigidly joining together corresponding portions of said tubes at a point between said mode selection member and corresponding extremities of said tubes, said termination means terminating vibrations developed in said tubes when they are caused to oscillate in said first and second mode.

9. A dual tube Coriolis mass flow rate sensor structure as recited in claim 1, wherein said mode selection means includes first and second selectively adjustable means respectively attached between, and near corresponding extremities of said tubular members, said first and second means each including a first element for attachment to one of said tubular members, a second element for attachment to the other of said tubular members, and a third element attached to and selectively positionable relative to said first and second elements for adjusting the stiffness of the respective said mode selection means along at least one said axis.

* * * * *